United States Patent [19]
Rochat et al.

[11] Patent Number: 5,334,992
[45] Date of Patent: Aug. 2, 1994

[54] COMPUTER DISPLAY COLOR CONTROL AND SELECTION SYSTEM

[75] Inventors: Roxanna F. Rochat; Joann M. Taylor; Novia A. Weiman, all of Beaverton, Oreg.

[73] Assignee: Tektronix, Inc., Wilsonville, Oreg.

[21] Appl. No.: 113,672

[22] Filed: Oct. 26, 1987

[51] Int. Cl.⁵ ............................................. G09G 1/28
[52] U.S. Cl. ..................................... 345/22; 345/150
[58] Field of Search ................. 345/22, 150; 364/518, 364/521

[56] References Cited

U.S. PATENT DOCUMENTS

| | | | |
|---|---|---|---|
| 4,464,652 | 8/1984 | Lapson et al. | 340/710 |
| 4,694,286 | 9/1987 | Bergstedt | 340/703 |
| 4,843,573 | 6/1989 | Taylor et al. | 364/521 |

OTHER PUBLICATIONS

Foley, J. D. et al., "Fundamentals of Interactive Computer Graphics," Addison-Wesley Publishing Co., 1982, pp. 183-214.

*Primary Examiner*—Ulysses Weldon
*Attorney, Agent, or Firm*—John D. Winkelman; Mark M. Meininger

[57] ABSTRACT

An interface system allows a user to select and control colors used in graphic images generated by a computer system. The interface system employs graphical representations of the hue, chroma, and lightness combinations capable of being rendered by a computer graphics system. In a preferred embodiment, the graphical representation includes a one-dimensional graph (40) depicting the range of hues and a two-dimensional graph (42) depicting the range of chroma and value combinations available for a selected hue. The graphical representations are preferably rendered in accordance with a Hue-Value-Chroma ("HVC") color space (90) having a high degree of perceptual uniformity.

13 Claims, 9 Drawing Sheets

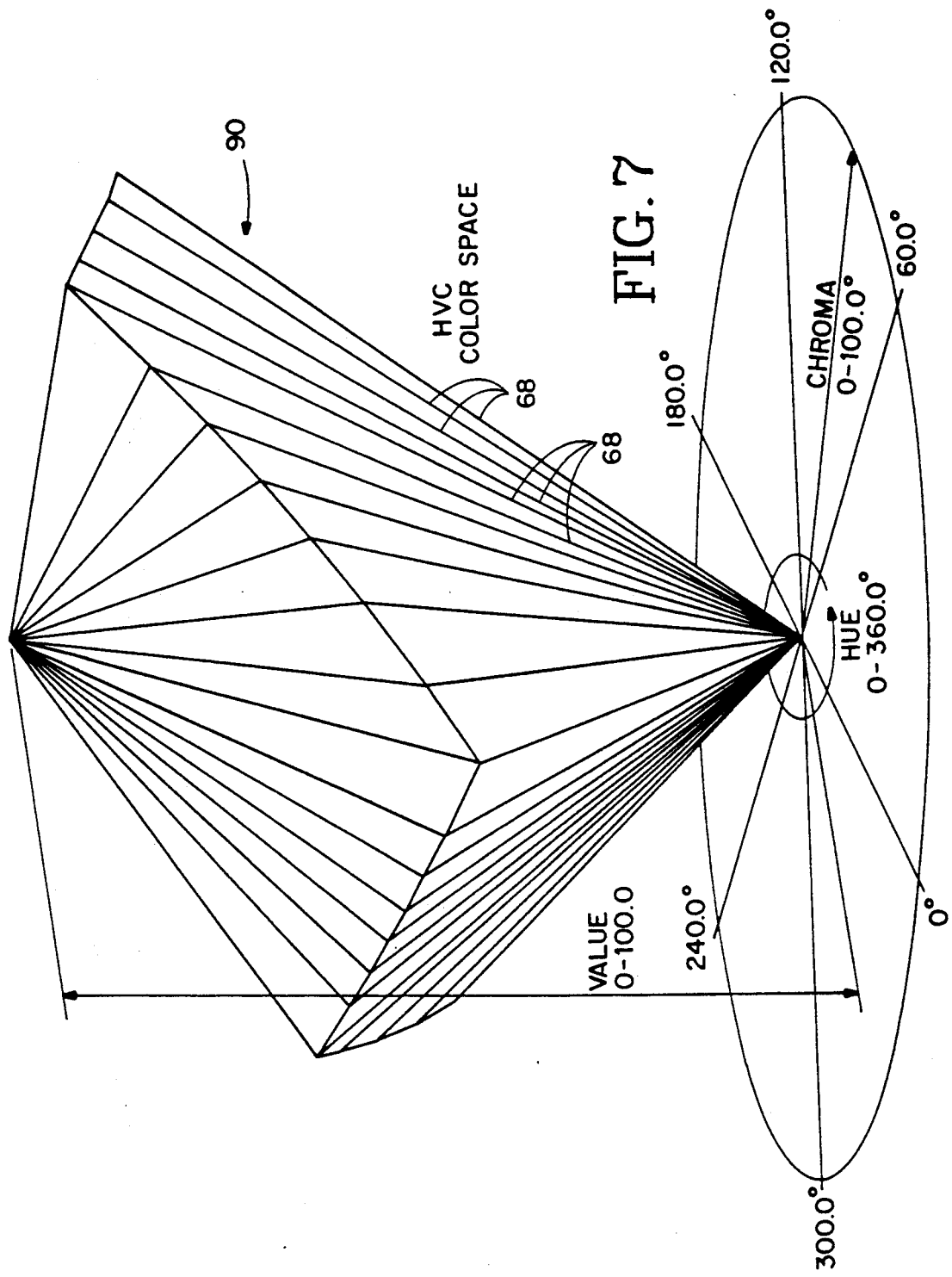

COMPUTER DISPLAY COLOR CONTROL AND SELECTION SYSTEM

BACKGROUND OF THE INVENTION

The present invention relates to computer systems and more particularly to systems for controlling and selecting the colors used in graphic images generated by computer systems.

The accurate control and specification of color in computer controlled color display devices is of great concern to those who utilize color as a means of organizing and displaying information. The desire to meet these control and specification requirements has resulted in the development of interfaces which allow the user to select different colors within the gamut of colors that can be produced by the display device. Such interfaces have in the past simply provided the user with the ability to specify digital-to-analog converter (DAC) values which correspond to voltages to be applied to the electron guns of color cathode-ray tube (CRT) displays. From a conceptual point of view, the interface allows the user to select the spatial coordinates corresponding to different colors through the use of a video red-green-blue (RGB) color space representing the signals applied to the display device. Prior color selection interfacers have not systematized the color selection process so as to provide an orderly approach to color selection or provided useful visual aids to assist in the color selection process.

The video RGB signal space color selection system has become widely used because it is readily correlated to the hardware (electron guns and associated drive circuitry) employed for creating CRT displays. However, it is important to note that the video RGB space is not a perceptually uniform color space. That is, at various locations within the space, a uniform change in the RGB designation will not necessarily result in a uniform change in the perceived color. The perceptual nonuniformity of the RGB space is a result of the nonlinearity of human vision in perceiving the color spectrum. The effect of the perceptual nonuniformity of the video RGB color space is that it is difficult for the user to predict what color will appear for any given change in RGB values.

In the past, numerous efforts have been made to develop perceptually uniform color spaces for facilitating color specification tasks. Many efforts to develop perceptually uniform color spaces have also been directed to correlating the color spaces to internationally accepted standards for color measurement so that the color can be accurately communicated and consistently reproduced. The most prominent international standards for color measurement are collectively termed the CIE system (Commission International de l'Eclairage or International Commission on Illumination).

The CIE system is based on the premise that specific perceived colors result from the proper combination of an illuminant or reference light source, an object, and an observer. A useful explanation of the CIE system is provided in "Principles of Color Technology", 2nd ed. 1981, by Billmeyer & Saltzman. Generally, the CIE system defines standard light sources having characteristic spectral power distribution curves. Each of the curves is a depiction of the relative luminous power of the source and the amount of light emitted by the source at each wavelength of the visible spectrum. The CIE system also defines a "standard observer" in terms of three color matching functions. The color matching functions are the relative magnitudes of three standard stimuli necessary to produce any color. Any object, the color of which is to be specified, has a characteristic spectral reflectance curve. The reflectance curve is a representation of the fraction of the light reflected from the object at each wavelength. The product of the spectral power distribution curve for a standard source and the reflectance curve of the object under study, when separately multiplied by each color matching function will, after suitable normalization, yield three curves, the area under each curve corresponding respectively to the three CIE tristimulus values XYZ. The values of the standard stimuli that define the color matching functions are such that the color matching function corresponding to the Y tristimulus value represents the human eye response to the total power of the light (i.e. luminance) reaching the eye. Accordingly, the tristimulus value Y provides an indication of the luminance of the color.

The CIE tristimulus values are related to a two-dimensional map of colors known as the 1931 CIE chromaticity diagram. The 1931 CIE diagram includes a horseshoe-shaped spectrum locus on which the spectral colors may be identified by their wavelengths. The coordinates of the chromaticity diagram are known as chromaticity coordinates x and y, and are derived by taking the ratios of the respective X and Y tristimulus values to the sum of all three tristimulus values X, Y and Z. The x and y chromaticity coordinates for any real color are located within the bounds of the spectrum locus and the line that joins the ends of the spectrum locus.

The x and y coordinates do not completely describe a color because they contain no information on the inherent luminance of a color. As noted, the Y component of the tristimulus values is a measure of the luminance of the color. Accordingly, a three-dimensional color specification system may be created by adding a third axis to the 1931 diagram which extends upwardly from the xy plane at the x and y coordinates of the source light. The third axis is the Y axis and is scaled in units of luminance. However, it is conventional to normalize the Y values from 0 to 1, representing the full range from black to white, respectively. At each level of luminance the area of the 1931 diagram, which represents the range of all possible colors that can occur, becomes smaller for increasing values of Y and terminates at a single "white point" at the maximum Y value.

The three-dimensional color specification system just described is known as the CIExyY system. In view of the above, it can be appreciated that any real color can be specified in terms of the CIExyY color specification system and directly related to the particular CIE tristimulus values XYZ. The CIExyY system is a widely accepted method for specifying color. Further, the 1931 CIE diagram or, more typically, data derived therefrom, is valuable because it can be used to predict the color of additive mixtures of two or more colors. That is, tristimulus values of component colors mathematically add to yield the tristimulus values of the resulting mixed color.

Efforts have been made to transform the CIE color specification system into a perceptually uniform color space, while preserving the additive mixing feature of the 1931 CIE chromaticity diagram.

One such transformation of the 1931 diagram includes a two dimensional uniform chromaticity diagram (known as the 1976 UCS diagram) having u' and v' coordinates that approximate a perceptually uniform color plane. The coordinates are known as the uniform chromaticity coordinates and are directly related to the x and y chromaticity coordinates (and hence, to the XYZ tristimulus values) as follows:

$$u' = 4x/(-2x+12y+3) = 4X/(X+15Y+3Z) \quad (1)$$

$$v' = 9y/(-2x+12y+3) = 9Y/(X+15Y+3Z) \quad (2)$$

As described, in the referenced text by Billmeyer & Saltzman, the 1976 UCS diagram defined by the u' and v' coordinates has been mathematically converted into a color space that approaches perceptual uniformity and is known as the CIELUV color space.

The u*,v* coordinates of the CIELUV system were formed with the achromatic colors at the origin (u*=0,v*=0) by subtracting the uniform chromaticity values $u'_n$ and $v'_n$ for the source light from those of the selected color.

The third coordinate of the CIELUV space, L*, known as the metric lightness function, lies perpendicular to the u*v* plane and intersects that plane at the origin. The L* axis is the axis of the achromatic colors (black, grey and white) and denotes variations in the lightness from L*=0 (black) to L*=100 (white).

As noted, all of the coordinates of the CIELUV space are directly related, via the CIExyY system to the CIE tristimulus values. These relationships are defined below:

$$L^* = 116 (Y/Y_n)^{\frac{1}{3}} - 16; \text{ for} \quad (3)$$

$Y/Y_n$ greater than 0.008856

$$L^* = 903.3 (Y/Y_n); \text{ for } Y/Y_n \quad (4)$$

less than or equal to 0.008856
where
Y = tristimulus value (lightness) of a color, and
$Y_n$ = lightness of the reference light source $$u^* = 13 L^*(u' - u'_n) \quad (5)$$

$$v^* = 13 L^*(v' - v'_n) \quad (6)$$

where
$u'_n$ and $v'_n$ are the uniform chromaticity coordinates for the reference light source.

The modified cube-root function for L* as shown above, yields a perceptually uniform scaling of lightness. It is common to alternatively refer to the visual sensation of lightness as value.

Hue is defined in the CIELUV color space as the angle made relative to the positive u* axis. The hue angle, h*, is defined as follows:

$$h^* = \arctan(v^*/u^*) \quad (7)$$

A third parameter, known as psychometric chroma $C^*_{uv}$, is adopted in conjunction with the CIELUV color space as a numerical representation of the chroma of a color. Chroma describes the saturation or vibrancy of a color. Chroma $C^*_{uv}$ equates to distance from the L* axis at a particular level of lightness or value. Accordingly, the notation $C^*_{uv}$ relates to the u*, v* coordinates, as follows:

$$C^*_{uv} = (u^{*2} + v^{*2})^{1/2} \quad (8)$$

The CIELUV space is the most nearly perceptually uniform space developed thus far.

SUMMARY OF THE INVENTION

It is an object of the present invention to provide a color selection interface incorporating improved methods for color selection and control in a computer system.

It is another object of the present invention to provide an interface which enhances the ease of color selection and manipulation in a computer system by utilizing graphics displays to assist in visualization of available color selections.

It is a further object of the present invention to provide a color selection interface which depicts available colors within a highly uniform color space in order to augment predictability and accuracy in the color selection process.

The present invention constitutes an interface system for use by a computer operator in selecting and controlling colors in graphics images generated by a computer system. The interface comprises a mechanism and method for displaying a graphical representation of hue, chroma and lightness combinations available on a display device and based on a color appearance type color space. The interface further comprises an associated mechanism and method for selecting any of the combinations of hue, chroma and lightness which are graphically displayed as available for use.

In the preferred embodiment the interface system incorporates the use of a specially defined HVC color space which exhibits a high degree perceptual of uniformity for displaying and selecting hue, chroma and value combinations. Further, the graphical representation includes a first graph depicting the range of hues in one dimension and a second graph depicting the range of chroma and value combinations in two dimensions. The preferred embodiment also includes a mechanism and method for operating the interface in three different modes providing functions corresponding to picture editing, color map editing and continuous shading. Picture editing allows the individual colors for different parts of a graphics image to be accessed for modification by picking a pixel associated with the color and positioning a cursor on the pixel. Color map editing allows the color data corresponding to various parts of a graphics image to be accessed according to memory location and directly manipulated. Continuous shading allows a range of colors for use in smooth shading type applications to be generated between two endpoint colors specified by the user. A number of other features are provided which, among other things, furnish one or more displays of samples or patches of selected colors (after translation of HVC color information into RGB signals suitable for controlling a color display device) and a display of numerical information on the CIE chromaticity coordinates of selected colors.

BRIEF DESCRIPTION OF THE DRAWINGS

FIG. 7 is an illustration of the HVC color space as incorporated into the present invention.

DESCRIPTION OF THE PREFERRED EMBODIMENT

Figures 1, 6:
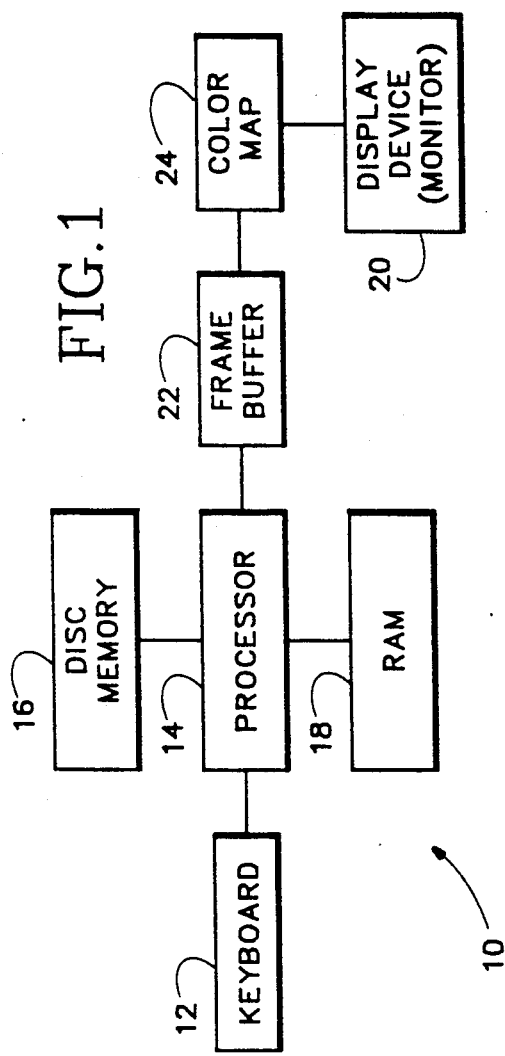
FIG. 1 is a block diagram of the components of a computer system suitable for implementing the present invention.
FIG. 6 is a picture of the banner comprising the options menu as provided by the present invention.

Referring now to FIG. 1, a computer system 10 which is suitable for practicing the present invention is illustrated. The computer system 10 includes an alphanumeric keyboard 12 for allowing user input, a microprocessor 14 for executing program instructions, a disc memory device 16 which allows nonvolatile storage of programs and data, RAM memory 18 for providing operational storage of programs and data and a cathode-ray tube (CRT) raster scan color monitor 20 for displaying color images. The computer system 10 also includes a frame buffer 22 and a color memory map 24 which operate in cooperation with the color monitor 20. Each of the components 12-24 is individually of conventional design and the system 10 is structured to respond to program instructions in the conventional manner. The microprocessor 14 executes programs held in the RAM memory 18 in response to inputs from the user by way of the keyboard 12 and provides data to the frame buffer 22 which controls the images displayed on the screen of the display device or monitor 20.

Figure 2:
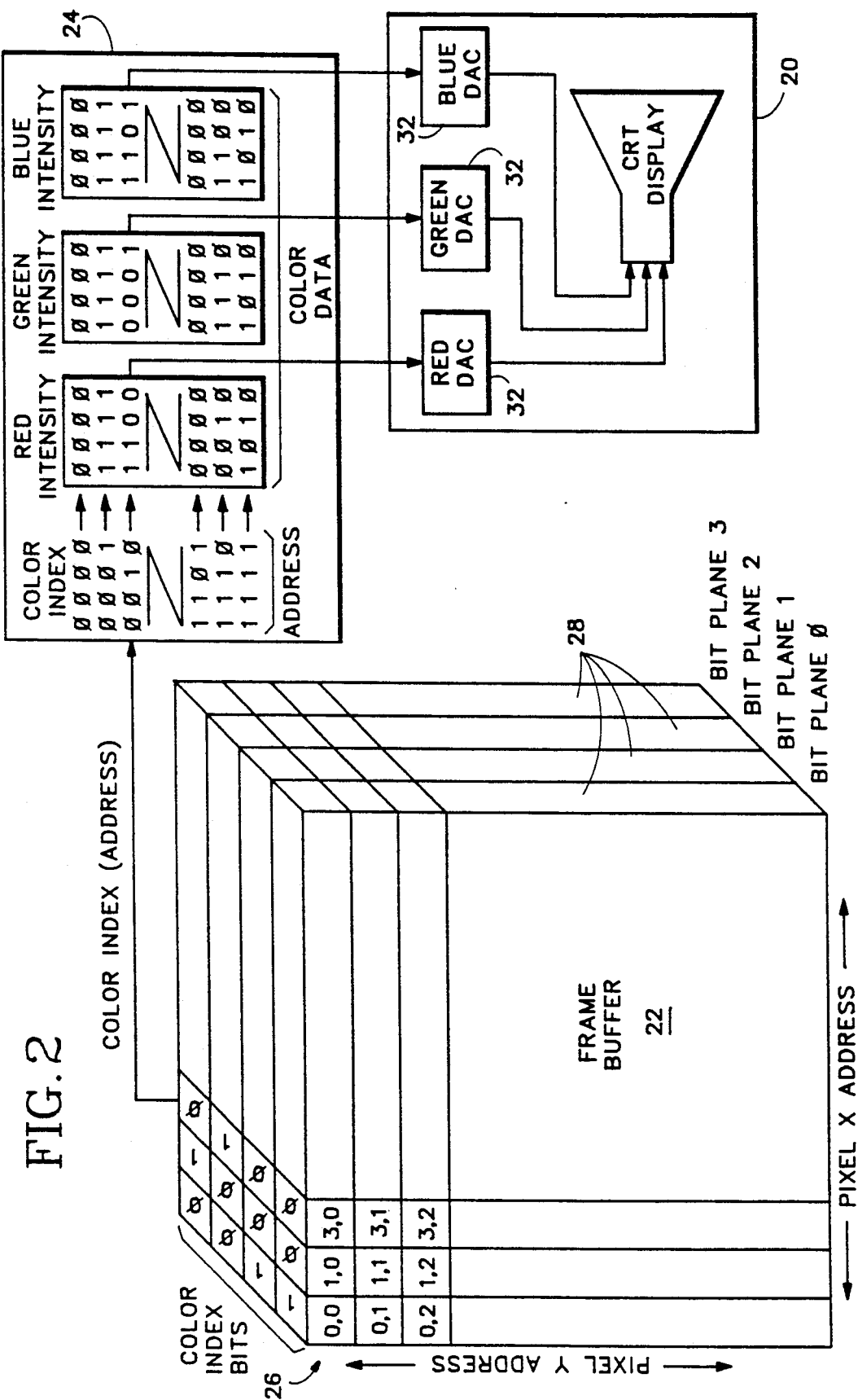
FIG. 2 is a diagrammatic illustration of the frame buffer, color map and display device components of the present invention and of their arrangement for cooperative operation.

The operation of the frame buffer 22 and color map 24 may be understood with reference to FIG. 2. The frame buffer 22 includes a large number of memory locations 26 (e.g. 0,1; 1,2; 3,3), each of which includes several bit planes 28 and each of which correlates with a specific pixel on the screen of the display monitor 20. The memory locations 26 in the frame buffer 22 each hold color index data entries which represent addresses of memory locations for color data information in the color map 24. The color data in the color map 24 correspond to voltage settings for the electron guns of the CRT display device 20. The required analog settings for the electron guns are provided by the digital-to-analog converters (DAC) 32 in response to color data from the color map 24 for each pixel on the screen of the display device 20. It should be noted that the frame buffer 22 and color map 24 actually operating on 8-bit chunks of data and not 4-bit chunks as diagrammatically illustrated in FIG. 2 for purposes of simplicity.

The present invention constitutes a color editor program which functions as an interface for controlling the computer system 10 and for allowing a computer operator or user to efficiently and accurately select colors for display on the display device or monitor 20. The color editor program may be considered to comprise two parts. In the first part, a graphical representation or color editor template is generated and displayed on the monitor 20 which among other things depicts the range of colors available for selection by the user. In the second part, the user is enabled by the functions provided by various commands available through the program to interact with the graphical representation and select a specific color for use by the computer system 10. In most cases, the selected color is then applied to part of a graphics image which is being created and displayed on the monitor through the use of a conventional type graphics generation program which is separate from the color editor program.

Figure 3:
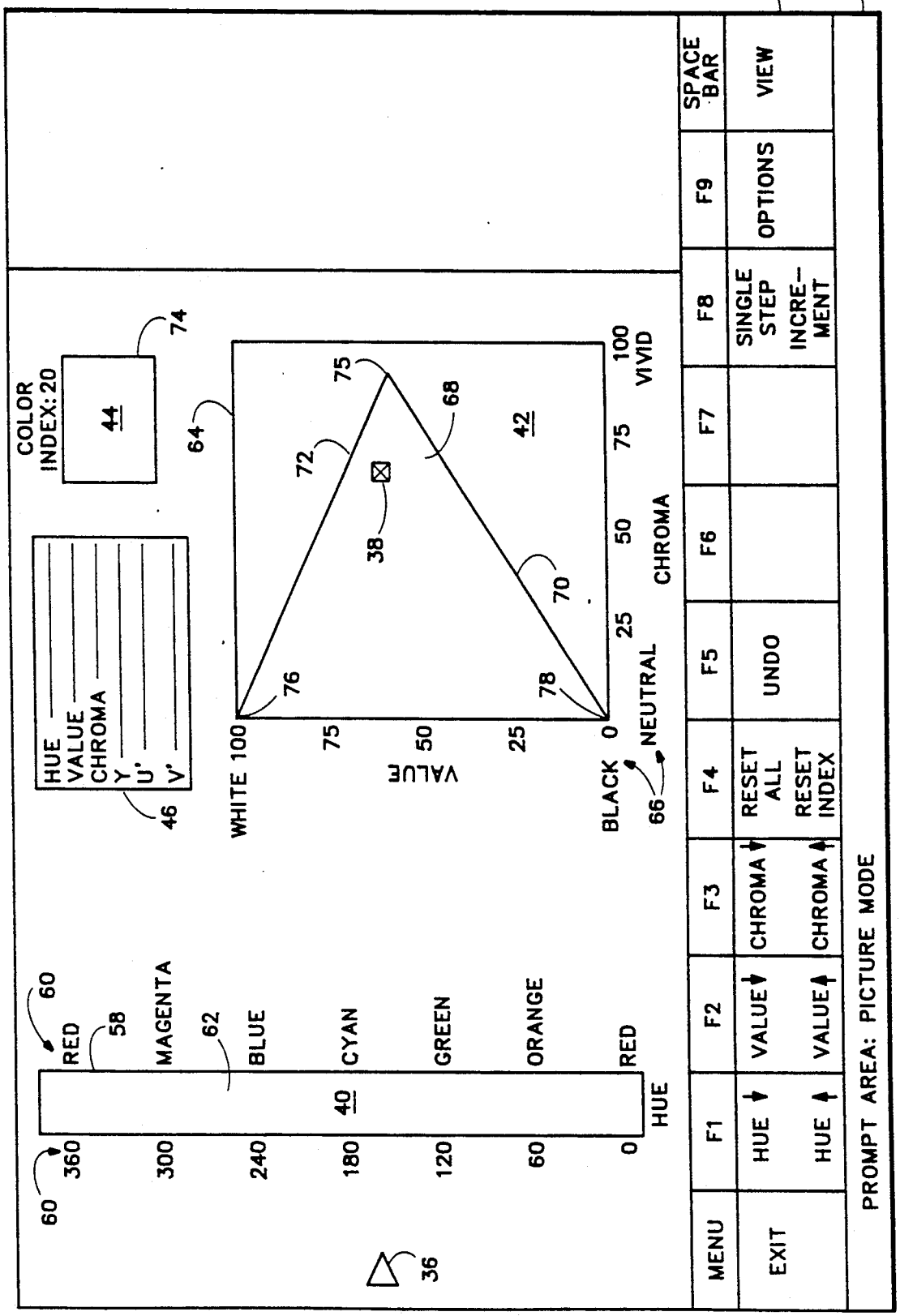
FIG. 3 is a picture of the display image provided by the present invention in picture mode.

Referring now to FIG. 3, a picture is shown representing the display image of the color template depicting the color selections available to the user with a color appearance space defining color in terms of attributes correlating with hue, chroma and value and also displaying other associated and useful information. The principal parts of the picture comprise a graph 40 depicting hue selections in one-dimension and a graph 42 depicting chroma and value selections in two-dimensions. The graph 40 also includes a hue arrow 36 which indicates the hues of specific colors selected by the user. The graph 42 includes a marker 38 which indicates chromas and values selected by the user. The picture also includes a block 44 or current color patch for displaying a sample of the current selected color, a block 46 of values numerically describing a selected A color in terms of 1976 chromaticity coordinates and HVC color space parameters, and a banner 80 which provides a menu showing available functions and the keys for activating these functions as well as a prompt area 48 for the display of messages from the program and the display of input from the user.

Figure 4:
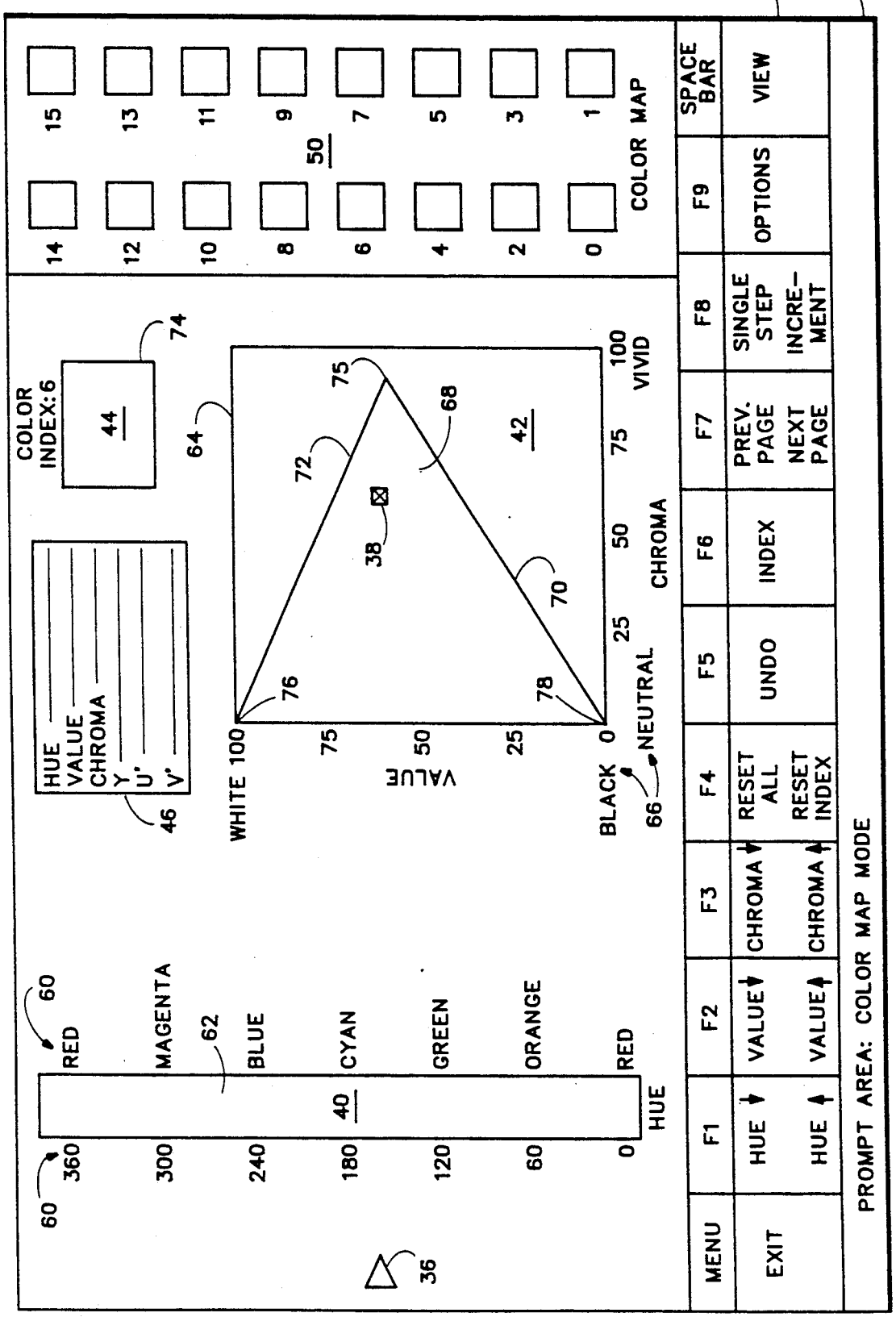
FIG. 4 is a picture of the display image provided by the present invention in color map mode.
Figure 5:
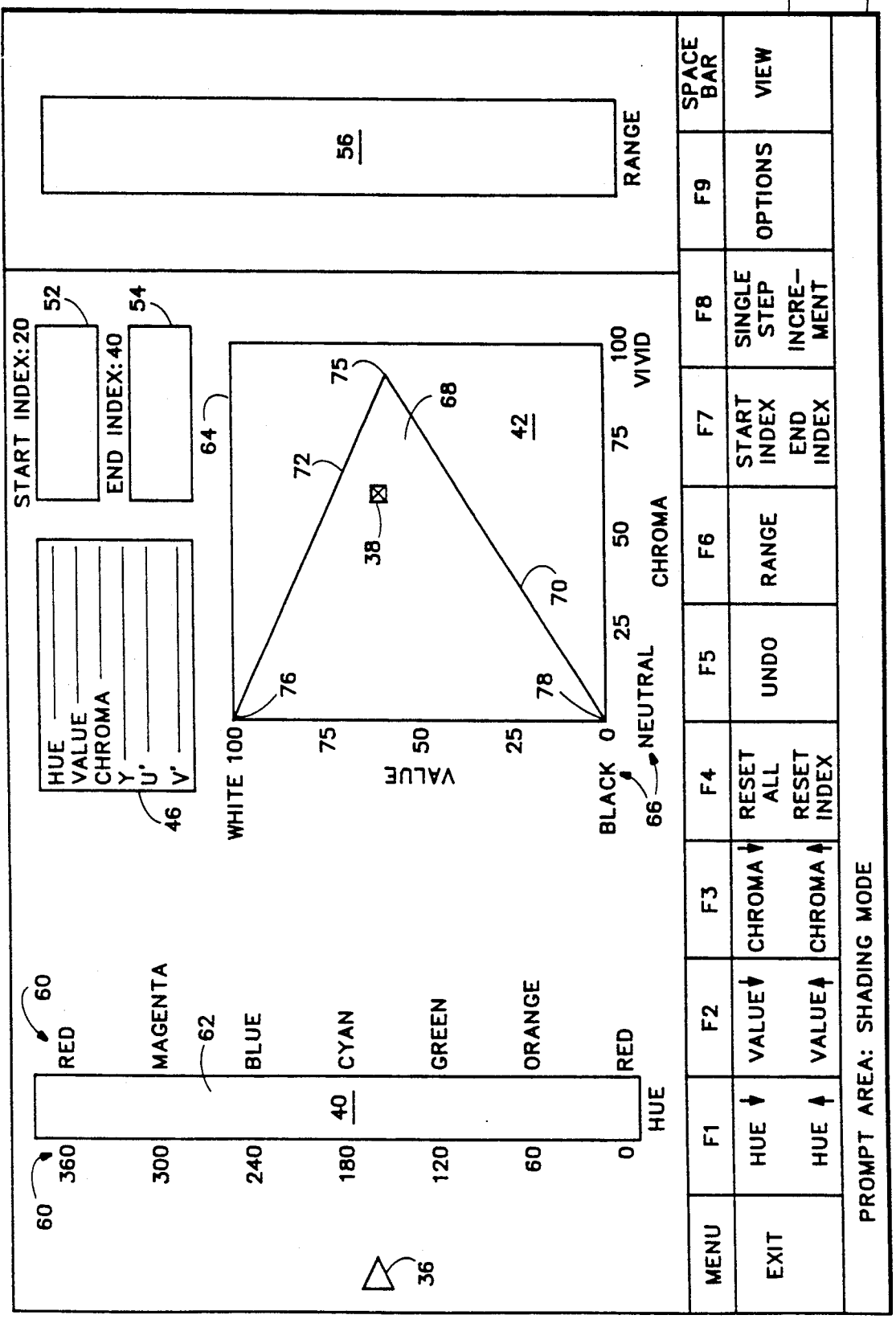
FIG. 5 is a picture of the display image provided by the present invention in shading mode.

Referring now to FIGS. 4 and 5, pictures are shown of display images provided in different modes of the present invention which modes incorporate additional features of the present invention. In FIG. 4, a set of sample blocks or patches 50 for displaying colors corresponding to color data at a series (or page) of indices in the color map 24 is shown. The sample patches 50 are useful in the color map editing mode which will be described more fully hereinafter. In FIG. 5, a pair of sample blocks or patches 52 and 54 are shown for displaying two separate start and end colors at different color indices in the color map 24 and a range bar 56 for displaying colors lying between the colors in the sample blocks 52 and 54. The sample blocks 52 and 54 and range bar 56 are useful in the continuous shading mode which will be described more fully hereinafter.

The components of the display images of FIGS. 3, 4 and 5 can be generated in accordance with conventional programming techniques for creating graphics display images. The graph 40 of hue selections may be generated by printing lines forming an appropriately dimensioned rectangular box 58. The legends 60 shown in FIGS. 3, 4 and 5 are then drawn at suitable positions alongside the box 58 as illustrated. The area enclosed by the box 58 is then divided into 72 horizontal segments of equal size running from the top to the bottom of the box 58. The segments are assigned to different color indices in the color map 24 and color data for different hues evenly spaced across the spectrum are written into the memory locations for the color indices assigned to the segments within the box, thereby to form a hue bar 62 comprising a range of hues inside the box 58. However, it should be noted that the hue bar 62 need not be colored and the graph 40 may, at the user's option, be employed by the user without a colored hue bar 62. The graph 40 depicts the range of hue selections as a function of vertical position (one dimension) in accordance with the varying colors of the hue bar and in correspondence with the scale of the legends provided alongside the box 58. The arrow 36 may be generated by drawing lines forming a triangle as shown. The position of the arrow 36 is controlled to conform to the hue level of the currently selected hue.

The graph 42 of the chroma and value selections may be generated by printing lines forming an appropriately dimensioned rectangular box 64. The legends 66 shown in FIGS. 3, 4 and 5 are then drawn at suitable positions alongside the box 64 as illustrated. For each hue selected, a hue slice or value/chroma (V/C) page 68 is outlined within the box 64 in order to display the chroma and value selections available for a given hue selected by the user. The hue slice or V/C page 68 is defined by two lines 70 and 72 which indicate the outer boundary of chroma and value selections in the selected hue. The hue slice 68 is not colored as is the hue bar 62 although such coloring is a possible alternative given sufficient memory capacity in the color map 24. The graph 42 depicts the range of available chromas and values in one hue as a function of vertical and horizontal position (two dimensions) in accordance with the V/C page defined by the lines 70 and 72 and in correspondence with the scale of the legends provided alongside the box 76. The marker 38 may be generated by drawing a small solid block as shown. The position of the marker 38 is controlled to conform to the levels of the currently selected chromas and values.

The point 75 and the two border lines 70 and 72 indicate the outer boundaries of the chroma and value combinations which are capable of being displayed by the particular monitor 20 or display device used by the system 10. The hue slice or V/C page 68 may therefore be thought of as depicting only the chroma and value selections in a given hue $H_s$ which are "reachable" by the display device with the phosphors or colorants which it utilizes. In the case of on RGB color monitor such as the monitor 20 the V/C pages 68 displayed on the graph 42 correspond to colors within a RGB triangle defined by the colors provided exclusively by each of the phosphors at full intensity on a chromaticity diagram such as the CIE 1976 UCS chromaticity diagram.

The point of maximum chroma 75 for a given hue must be calculated in a multistep process primarily through the use of chromaticity coordinates such as those provided in relation to the CIE 1976 UCS chromaticity diagram.

Figures 9A, 9B:
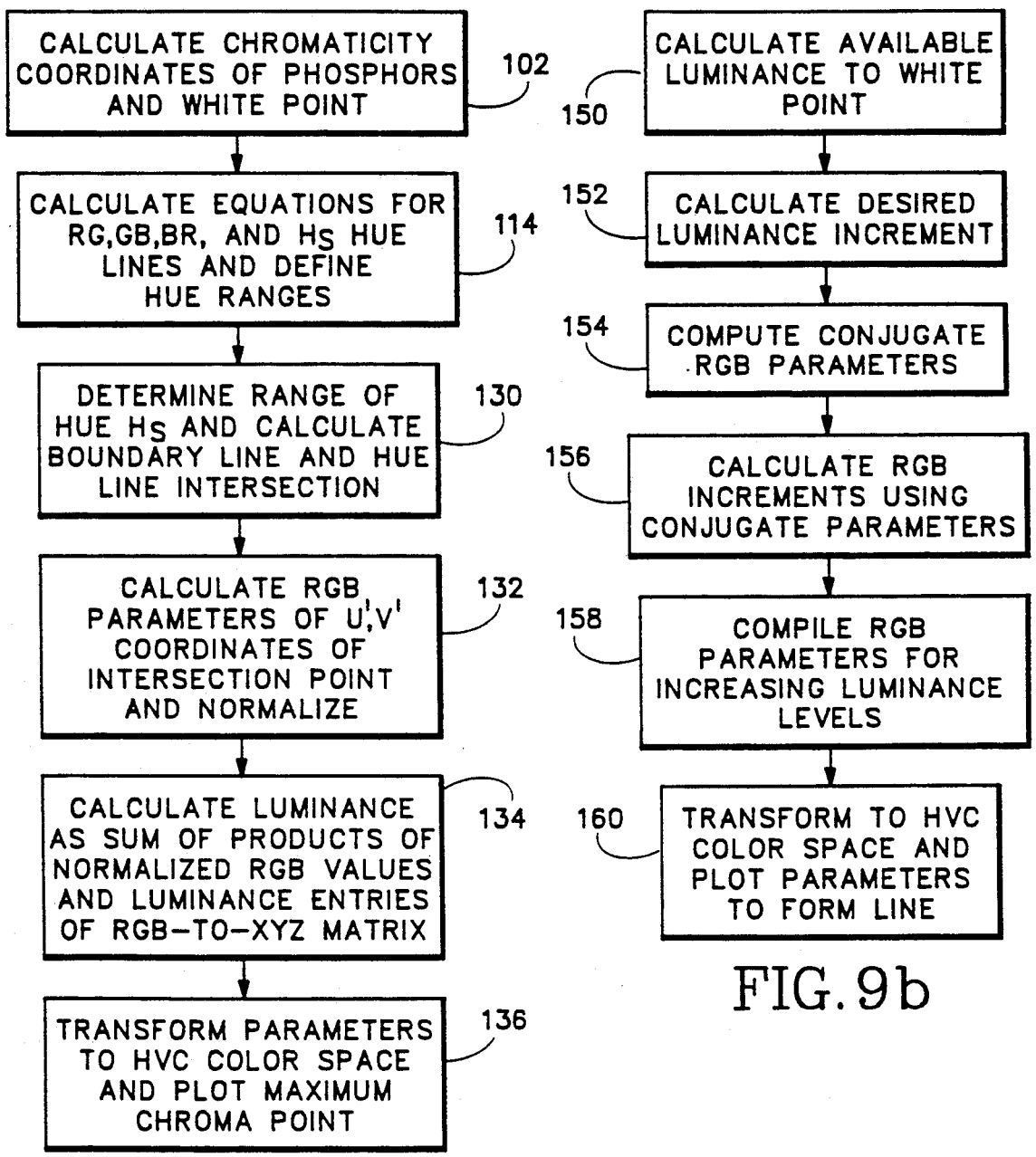
FIGS. 9a and 9b are flowcharts describing the processes employed in calculating parameters used in forming chroma and value graphs.

Referring now to FIG. 9a, a flowchart is illustrated for the processes that generate the data specifying the position of the point 75. In the first step 102 the UCS chromaticity coordinates $u'_w$, $v'_w$ of the white point for the display device and each of the chromaticity coordinates $u'_r$, $v'_r$, $u'_g$, $v'_g$, $u'_b$, and $v'_b$ of the "pure" phosphor colors at maximum intensity are determined. These coordinates may be obtained by multiplying a RGB-to-XYZ matrix [A], which is described more fully hereinafter, by RGB intensity vectors having appropriate unitary entries corresponding to the respective white, red, green, and blue points:

$$\begin{bmatrix}1\\1\\1\end{bmatrix}_w, \begin{bmatrix}1\\0\\0\end{bmatrix}_r, \begin{bmatrix}0\\1\\0\end{bmatrix}_g, \begin{bmatrix}0\\0\\1\end{bmatrix}_b,$$

in order to obtain CIE tristimulus values which may be used to compute the required $u'$, $v'$ coordinates as per equations (1) and (2).

Figure 10:
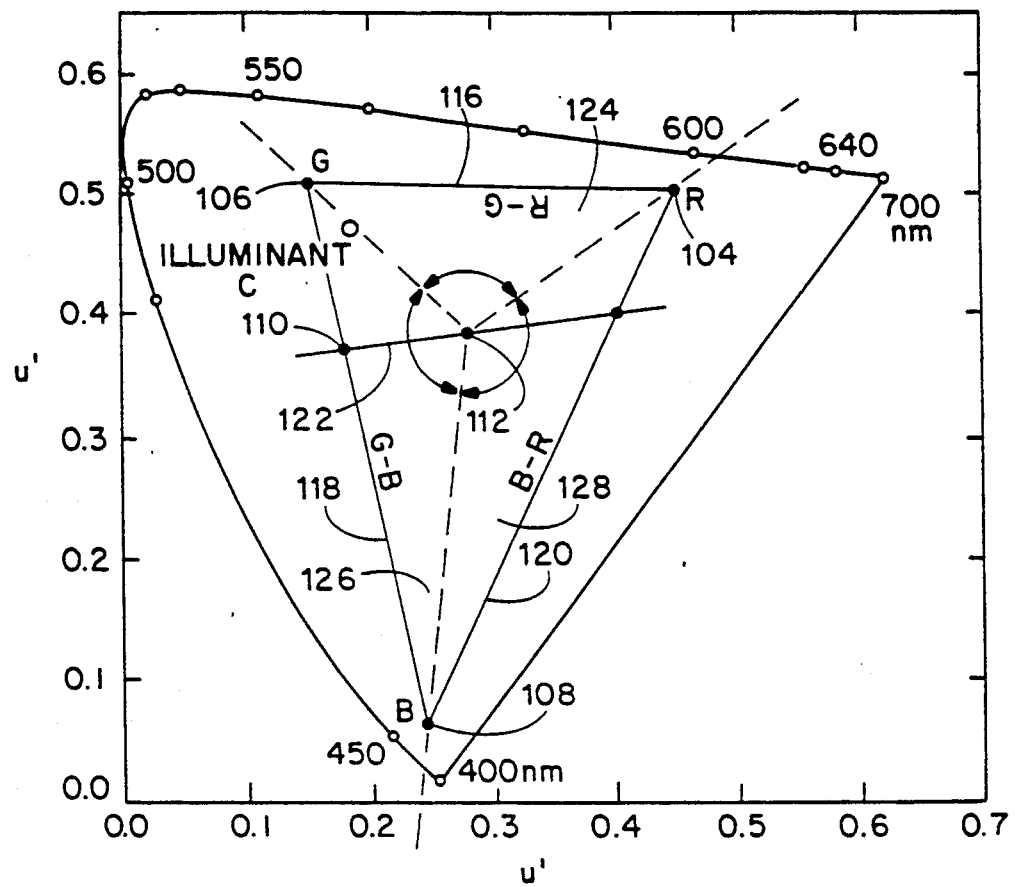
FIG. 10 is a CIE 1976 UCS chromaticity diagram including information illustrative of how certain parameters used in forming chroma and value graphs are determined.

The results of steps 102 are diagrammatically shown on the UCS chromaticity diagram of FIG. 10. The points 104, 106, and 108 represent the positions of pure phosphor colors. The point 112 represents the position of reference white for the display device.

Equations $E_{RG}$, $E_{GB}$, $E_{BR}$ in $u'$, $v'$ coordinates define the RG, GB and BR gamut boundary lines 116, 118 and 120, respectively. The lines 116, 118, and 120 connect the phosphor color points 104, 106 and 108. An equation $E_{SW}$ defines a hue line 122 passing through the white point 112 having coordinates $u'_w$, $v'_w$ and over the positions of the chromas for the hue $H_s$. In step 114, the equations $E_{RG}$, $E_{GB}$, $E_{BR}$, and $E_{SW}$ are calculated.

Following these calculations the hue parameters $H_R$, $H_G$, $H_B$ of the phosphor colors corresponding to points 104, 106 and 108 are determined and all hues are divided into three ranges $R_1$ ($H_R < H < H_G$), $R_2$ ($H_G < H < H_B$) and $R_3$ ($H_B < H < H_R$) which correlate with the sectors 124, 126 and 128 of the RGB triangle and which include the lines 116, 118 and 120, respectively.

In step 130, the range $R_i$ (i.e., $R_1, R_2$ or $R_3$) in which the hue $H_s$ resides is determined and the gamut boundary line $L_i$ (i.e., 116, 118 or 120) which is intersected by the hue line 122 within the sector $S_i$ (i.e., $S_1$, $S_2$ or $S_3$) corresponding to the Range $R_i$ is identified. The point of intersection 110 of the hue line 122 with the appropriate gamut boundary line $L_i$ is then calculated and thereby the $u'_i$, $v'_i$ coordinates of maximum chroma for the hue $H_s$ are determined.

However, the luminance level corresponding to these coordinates must also be determined. This may be accomplished starting in step 132 by assuming an arbitrary luminance level $LV_i$ of 1 and computing the correlative XYZ tristimulus values for the coordinates $u'_i$, $v'_i$ and the luminance $LV_i$. The XYZ-to-RGB matrix $[A^{-1}]$ is used to compute the RGB parameters $R_i$, $G_i$, $B_i$ corresponding to the chromticity coordinates $u'_i$, $v'_i$ and the luminance $LV_i$ (=1).

These parameters are then normalized by dividing each member of the set $R_i$, $G_i$, $B_i$ by the largest member of this set in order to compute normalized parameters $R_{ni}$, $G_{ni}$, $B_{ni}$ corresponding to the coordinates $u'_i$, $v_i$ at maximum attainable luminance.

In step 134 the luminance may then be calculated by multiplying the parameters $R_{ni}$, $G_{ni}$, $B_{ni}$ by the Y tristimulus values making up the second row of the RGB-to-XYZ matrix. Each parameter $R_{ni}$, $G_{ni}$, $B_{ni}$ is multiplied by the Y tristimulus value entries of the matrix for the color to which it corresponds. The resulting products are summed together to provide the desired luminance level $L_s$. This process may be expressed as follows:

$$L_i = (R_{ni} * Y_r) + (G_{ni} * Y_g) + (B_{ni} * Y_b)$$

where $Y_r$, $Y_g$ and $Y_b$ are the appropriate values from the matrix [A].

In the final step 136 the $u'_s$, $v'_s$ coordinates and the luminance value $L_s$ are translated to HVC color space. The resulting V and C parameters within HVC space define the position of the maximum chroma point 75.

The positions for the lines 70 and 72 are determined in different ways. The line 70 is simply a straight line connecting the black point (0,0,0) to the maximum chroma point 75. The line 70 represents increasing levels of lightness at fixed chromaticity coordinates. However, the line 72 must be determined piecewise by repeated calculations using, among other things, the RGB-to-XYZ matrix, the previously calculated RGB paramaters $R_{ni}$, $G_{ni}$, $B_{ni}$ and luminance value $L_s$.

Referring now to FIG. 9b, in accordance with step 150 the amount of available luminance $L_a$ between the maximum chroma point 75 and the white point is computed by subtracting $L_s$ from 1 as expressed below:

$$L_a = 1 - L_s.$$

In step 152 the available luminance $L_a$ is divided by a number N reflecting the number of plotting points desired to define the line 72 in order to thereby determine a luminance increment. This procedure may be expressed as shown below:

$$L_{IN} = (1 - L_s)/N.$$

In step 154 "conjugate" RGB parameters $R_{cni}$, $G_{cni}$, $B_{cni}$ are determined by subtracting each of the parameters $R_{ni}$, $G_{ni}$, $B_{ni}$ from 1 as shown below:

$$R_{cni} = 1 - R_{ni}$$

$$G_{cni} = 1 - G_{ni}$$

$$b_{cni} = 1 - B_{ni}.$$

In step 156 the conjugate paramaters $R_{cni}$, $G_{cni}$ and $B_{cni}$ are divided by the total number of increments N in order to develop RGB increments $R_{IN}$, $G_{IN}$ and $B_{IN}$ correlating with each luminance increment.

In step 158, a table of the RGB parameters for incrementally increasing luminance levels may then be compiled using equations in the form shown below:

$$L_T L_S + L_{IN} * T$$

$$R_T R_{ni} + R_{IN} * T$$

$$G_T G_{ni} + G_{IN} * T$$

$$B_T B_{ni} + B_{IN} * T$$

for T increasing from 1 to N−1 where N equals the number of points and increments as indicated previously. The $R_T$, $G_T$, $B_T$ values may be used to determine the u', v' coordinates of new chromas corresponding to increasing luminances.

In step 160 the $L_T$ and $R_T$, $G_T$, $B_T$ values are translated into Hue-Value-Chroma ("HVC") parameters in HVC color space by methods more fully explained hereinafter with reference to the HVC color space. The HVC parameters corresponding to the $L_T$ and $R_T$, $G_T$, $B_T$ values may be used to plot the line 72.

With reference to FIG. 10 the process of generating maximum chroma values for increasing luminance levels may be understood as adding whiteness to the color represented by point 110. The u', v' coordinates of the resultant colors are positioned along the line 122 and approach to the white point 112.

It should be noted that the points used in forming the line 72 might be alternatively specified by defining increments in value (or metric lightness) within HVC space. These value increments would then be translated into luminance increments for making the required calculations of corresponding maximum chromas. The luminance increments Would not be of constant size but would provide a more uniformly spaced set of points for plotting the line 72.

The sample block or patch 44 shown in FIG. 3 for displaying a selected color can be created by drawing lines forming the box 74, drawing a legend indicating the color index of the selected color, and assigning the color index corresponding to the selected color to the pixels enclosed by the box 74. Likewise, the sample blocks or patches 50 shown in FIG. 4 for displaying the colors corresponding to a page of color indices can be generated by drawing lines to form boxes in an array as illustrated, determining the color indices to be associated with each of the boxes, drawing legends indicating the color indices with which each box is associated and assigning the indicated color index to the pixels enclosed by each box.

The sample blocks or patches 52 and 54 of FIG. 5 are similarly created by drawing lines to form boxes, drawing legends indicating the color indices and functions associated with each box and assigning the color indices corresponding to selected colors to the pixels enclosed by each box. The range bar 56 is generated by drawing lines to form an appropriately dimensioned box as shown and adding an appropriate legend. The area enclosed by the box is then divided into equal segments along its vertical dimension. The number of segments is equal to the number of indices between the indices selected for blocks 52 and 54. The pixels in each segment are assigned the color indices between the indices selected for blocks 52 and 54 in order of their numeric value and in correspondence to the vertical position of each segment.

The banners 80, 82 and 84 illustrated in FIGS. 3, 4 and 5, respectively, are generated simply by printing the appropriate lines and legends. The names correspond to available commands and their associated functions. The designations F1-F9, and space bar correspond to keys (F1-F9=function keys) on the keyboard 12 for activating the commands listed below them. When two names indicating commands are provided below a single key designation, the upper entry represents the function implemented by simultaneously depressing the shift key and the designated key. The areas around the commands are preferably made sensitive to cursor position so that a mouse or any similar device can be used to conveniently actuate the commands.

The program provides three different modes which may be employed by the user for controlling color selection in different ways. If the user wishes to modify a single color in a graphic image, the picture (edit) mode provides this function. If the user wishes to modify the colors in a graphics image with reference to the color map and associated indices, the color map (edit) mode provides this function. If the user wishes to create a range of continuous colors for smooth shading, the shading (edit) mode provides this function. The user may move between different modes using the options menu which is provided as an alternative command within each mode and which invokes the banner 86 illustrated in FIG. 6. The functions shown by the banners 80, 82, 84 and 86 may be activated through the keyboard 12 or preferably via the mouse which incorporates cooperative action between the cursor and the mouse device itself (i.e., clicking of buttons). The position of the cursor may be used to indicate particular hues or chromas and values for selection and to indicate specific command functions for activation.

In the picture edit mode, the color index to be edited is determined by the position of the cursor at the time the color editor program is invoked. The color index to be edited is the index of the pixel covered by the cursor. The color editor template illustrated in FIG. 3 is displayed in the picture edit mode. The banner 80 indicates the available command functions as well as other alternatives. The prompt area contains the message "Picture Mode". Additional prompts based on user selections may follow this message. In the picture edit mode, the current pixel may be changed at any time, simply by selecting a new pixel from the graphics image being worked on. Selection is made by positioning the editor cursor over the desired pixel in the graphics image as accessed through the view command. The command names as used for color editing in picture mode and their functional descriptions are listed below in Table I.

TABLE I

| KEY | NAME | DESCRIPTION |
|---|---|---|
| Menu | Exit | Exits the Color Editor. This command saves the Color Map and terminates the Color Editor Program. |
| F1 | Hue Up | Increments the Hue parameter. The Hue is incremented by either unit steps or a different predefined step-size. (The status of the cursor mode (See F4) dictates which increment is used.) As the user increments the Hue, the current color patch 44 displays the corresponding color. The text in block 46 showing the Hue parameter and the CIE coordinates is also updated. The arrow 36 pointing to the Hue bar 62 will move to the newly selected Hue and the V/C page will update to display the page 68 shape for the selected Hue. The Hue parameter corresponds to angular degrees and has, therefore, a range from 0.0 to 359.9. If the user continues to increment the Hue to 360 and beyond, the Hue resets to 0.0 and continues incrementing from there (i.e. wrapping occurs). |
| SH F1 | Hue Dn | Decrements the Hue parameter. The Hue is decremented by either unit steps or a different predefined step-size. As the user decrements the Hue, the current color patch 44 displays the corresponding color. The text block 46 showing the Hue parameter and the CIE coordinates is also updated. The arrow 36 pointing to the Hue bar 62 will move to the newly selected Hue and the V/C Page 68 will update to display the page shape for the selected Hue. |
| F2 | Value Up | Increments the Value parameter. The Value is incremented by either unit steps or a different predefined step-size. As the user increments the Value, the current color patch 44 ]displays the corresponding color. The text in block 46 showing the Value parameter and the CIE coordinates is also updated. The marker 38 in the V/C Page 68 will update to reflect the position of the new Value level. The Value parameter has a range from 0.0 to 100.0. The user is not permitted to exceed a magnitude of 100.0 for the Value parameter. (i.e. wrapping is not permitted). |
| SH F2 | Value Dn | Decrements the Value parameter. The Value is decremented by either unit steps or a different defined step-size. As the user decrements the Value, the current color patch 44 displays the corresponding color. The text in block 46 showing the Value parameter and the CIE coordinates is also updated. The marker 38 in the V/C Page 68 will update to reflect the position of the new value level. |
| F3 | Chroma Up | Increments the Chroma parameter. The Chroma is incremented by either unit steps or a different predefined step-size. As the user increments the Chroma, the current color patch 44 displays the corresponding color. The text in block 46 showing the Chroma parameter and the CIE coordinates is also updated. The marker 38 in the V/C Page 68 will update to reflect the position of the new Chroma level. The Chroma parameter has a range from 0.0 to 100.0. The user is not permitted to exceed a magnitude of 100.0 for the Chroma parameter (i.e. wrapping is not permitted). |
| SH F3 | Chroma Dn | Decrements the Chroma parameter. The Chroma is decremented by either unit steps or a different predefined step-size. As the user decrements the Chroma, the current color patch 44 displays the corresponding color. The text in block 46 showing the Chroma parameter and the CIE coordinates is also updated. The marker 38 in the V/C Page 68 will update to reflect the position of the new Chroma level. |
| F4 | Increm Step | Sets cursor mode to incremental step size. When the user is modifying the HVC parameters (notations) using the function keys F1, F2, and F3 (as well as their SHIFT counterparts), they will either increment or decrement by the incremental step size. The indicators hue arrow 36 and V/C marker 38 on the Hue Bar 62 and V/C Page 68, respectively, will move in the direction of the cursor keys by an increment proportional to the step size for the selected color attribute. The step sizes are 10.0 units for the Hue and 5.0 units for both Value and Chroma. |
| SH F4 | Single Step | Sets cursor mode to single or unit step size. When the user is modifying the HVC parameters (notations) using the function keys F1, F2, and F3 (as well as their SHIFT counterparts), |

TABLE I-continued

| KEY | NAME | DESCRIPTION |
|---|---|---|
| | | the parameters will either increment or decrement by one. The indicators hue arrow 36 and V/C marker 38 on the Hue Bar 62 and V/C Page 68, respectively, will move in the direction of the cursor keys by an increment proportional to the single step size. |
| F5 | Reset Index | Resets the current color to its original HVC parameters (notation). The HVC parameters values of the color are restored to the same levels defined when the user entered the system or last saved the particular color index within the system color map. The Hue bar, the V/C Page, the HVC and chromaticity text, and the current color patch are also restored to illustrate the original color. This command may be reversed through use of the Undo key (F6). |
| SH F5 | Reset All | Resets all indices in the Color Map to their previous parameters (notations). All indices in the Color Map are restored to their original color parameters at the time when the user either invoked the color editor or last saved the Color Map. This command may be reversed through use of the Undo Key (F6). |
| F6 | Undo | Undoes the last Hue, Value, and/or Chroma selection. This command resets the Hue, Value, or Chroma level to the level defined prior to the last modification operation. In addition, this function will also reverse the Reset Index (F5) and Reset All (SH F5) commands. |
| Select | Options | Sets Options for the color editor. This command allows the user greater utility in the use of the color editor and more flexibility in editing colors by accessing an optional menu. In addition to modifying the color of the current pixel (Picture Mode), the user may modify a range of colors (Shading Mode), or modify the system Color Map (Color Map Mode). The user may also control the appearance of the Hue Bar 62. The color map is automatically saved when the user switches modes. |
| SPACE BAR | View | Previews the graphics image. This command permits display of the screen area of the graphics image covered by the Color Editor Template. If the space bar is pressed a second time, the Color Editor Template is restored, as are all editor functions. If the full color Hue Bar option was in use, it is also restored. |

Upon selection of the option command within any of the edit modes (i.e. picture, shading or color map) the banner 80, 82 or 84 at the bottom of color editor template is replaced by a new banner 86 consisting of the options menu. FIG. 6 shows the configuration of the options banner 86 for the three edit modes. The banner 86 indicates the command edit functions as well as other alternative commands. The prompt area 48 will contain a message conveying the current Mode. The messages for the three modes are "Picture Mode", "Shading Mode" and "Color Map Mode". Additional prompts based on user selections and/or errors may follow this message as shown. The names, keys, and functional descriptions for all options menu commands are listed below in Table II.

TABLE II

| KEY | NAME | DESCRIPTION |
|---|---|---|
| Menu | Exit | Exits the Color Editor. This function saves the color map and terminates the Color Editor Program. |
| F1 | Picture | Goes to Picture Mode. This mode allows modification of the colors for pixels in a graphics image and permits the user to select colors by picking a pixel or point on the screen and then altering the color data for the color index corresponding to the pixel. |
| F2 | Shading | Goes to Shading Mode. This allows the user to select two colors, either by picking pixels or directly by designating color indices, and obtain a range of evenly spaced colors between them. This mode allows the user to alter or to create color series in a uniform and predictable manner. |
| F3 | Map | Goes to Color Map Mode. This allows selection of colors by direct modification of the color data corresponding to indices in the system color map (FIG. 2). Indices within the color map are specified and their associated colors are then edited. |
| F4 | Hue | Displays the Hue Bar 62 in full color. This option displays the most saturated colors at selected Hues to illustrate the range of available Hues in a meaningful, associative fashion. Due to limitations in the size of the color map 24 and the number of usable color indices, only a fraction (72) of the available Hues can actually be displayed in the Hue Bar 62, however, all available hues may be selected from the Hue graph which includes the hue bar. Note: In order to display the colors in the Hue Bar 62, the color data for the top 72 indices of the color map 24 must be overwritten with the appropriate color data. If any part of the screen utilizes the same color map indices, then those areas will be temporarily displayed in the Hue Bar 62 colors. After Hue selection the original color data is restored to the color map 24. |
| SH F4 | No Hue Color | The Hue bar 62 is displayed without color. If the Hue Bar 62 was in full color, this will remove color from the Hue Bar 62 and insure that the top 72 color map indices retain their user-assigned data. This is the default option for the Hue Bar 62. |
| F6 | Map Up | Makes the system Color Editor Template available. This command is only present if the user has selected Shading Mode (F2) and is automatically invoked if the user enters Shading Mode from Color Map Mode. The Color Map is not erased and repainted, but remains. |
| SH F6 | Map Dn | Removes the system Color Editor Template. This command is only present if the user has selected Shading Mode (F2) and is automatically invoked if the user enters Shading Mode from Picture Mode. |
| Next Screen | Next Page | Displays the next page of the Color Map. This command is present only for modes in which the Color Map is displayed on the screen. |
| Prev Screen | Prev Page | Displays the previous page of the Color Map. This command is present |

TABLE II-continued

| KEY | NAME | DESCRIPTION |
|---|---|---|
| | | only in modes in which the Color Map is displayed on the screen. |
| Select | Edit | Returns to the Color Editor. Upon selection of desired options, this command will restore the Color Editor Template and will allow the user to begin direct selection and/or modification of system colors. |
| SH Select | Default | Saves the current options as the system defaults. This Function allows the user to customize the color editor to best fit his needs. Once the user has selected the desired options, they may be saved with this command. Upon reinvoking the editor, the selected options will be displayed as the new defaults. |

In the shading mode, a range of colors may be selected for smooth shading or other applications. In this mode the user is permitted to select two colors and obtain a range of colors in between the two selected colors. These range colors may be incremented in large steps or in small enough steps to provide whatever shading is required. Since it is conceivable that the user who is doing smooth shading may wish to manipulate colors via the direct selection of pixels or through the system color map, both types of manipulation are permitted within the shading mode, thereby eliminating the need for the user to switch modes. Shading mode also gives the user the capability to alter an existing color series (from a graphics image) in a uniform and predictable manner.

FIG. 5 shows the color editor template employed in the Shading Mode. The color editor template in the Shading Mode includes two color patches 52 and 54 marked start and end, respectively. In addition, a range bar 56 is also added to the template, which displays the range of shaded colors between the selected start and end colors. A banner 84 is provided with the appropriate commands and key assignments and the prompt area message reads "Shading Mode". The user may edit the start or end colors and then have the editor produce a series of colors in between in response to the range command.

If the user has selected the hue color option, the colors of the hue spectrum are stored in the 72 uppermost indices of the color map 24 (FIG. 2). If a selected range of colors utilizes any or all of these particular indices, the editor will temporarily swap the hue bar colors into different indices. This may temporarily alter the appearance of the picture, but upon actuating the view command, all of the correct colors will appear in the graphics image at the pixels corresponding to the appropriate color indices. If the selected range of colors is so large that there are not enough indices to store the colors for the hue bar, the hue color mode will be ignored and the hue bar will appear uncolored.

The number of colors within the range is dictated solely by the number of available color indices between the start and end indices. The larger the difference between the start and end indices, the smoother the shading.

The commands in the banner 84 are the same as for Picture editing, with the exceptions listed in Table III below.

TABLE III

| KEY | NAME | DESCRIPTION |
|---|---|---|
| F7 | Range | Compute the range of colors between the start and end indices. The number of colors within the range is entirely dependent on the number of color map indices between the start and end colors. The colors within the range are exclusive of the start and end colors. For example, if the start Index is 10 and the end Index is 20, there are 9 indices in the range (11-19). Note: If the start index is greater that the end index, the two indices will be effectively reversed for the purpose of shading. |
| SH F7 | Index | Select a new color map index to edit. This command is only present if the Map Up command is invoked. Upon selection, the user is prompted to enter an index within the color map. One of the color patches 52 and 54 in the Editor Template will display the requested index number and the color assigned to that index. The HVC parameters and the chromaticity coordinates in block 46 are also updated. The arrow 36 pointing to the Hue Bar 62 will move to the newly selected Hue and the V/C Page 68 will update to display the page shape (color range) for the selected Hue. The V/C marker 38 will point to the color's position within the V/C page. |
| F8 | Start | Select the start color for shading. After the user selects the desired color, the start color patch 52 in the color editor template displays the new selection. The HVC parameters and the chromaticity coordinates in block 46 are updated. The arrow 36 pointing to the Hue Bar 62 will move to the newly selected Hue and the V/C Page 68 will update to display the page shape for the selected Hue with the V/C marker 38 at the appropriate position for the start color. Colors may be selected by choosing a pixel on the screen. If the pixel is covered by the Editor Template, the user may access the area underneath by invoking the View command (press space bar). The Color Editor Template is restored by pressing the space bar a second time. |
| SH F8 | End | Select the end color for shading. After the user selects the desired color, the end color patch 54 in the color Editor Template displays the new selection. The HVC parameters and the chromaticity coordinates in block 46 are updated. The arrow 36 pointing to the Hue Bar 62 will move to the newly selected Hue and the V/C Page will update to display the page shape for the selected Hue with the V/C marker 38 at the appropriate position for the end color. Colors may be selected directly by choosing a pixel on the screen. |
| Next Screen | Next Page | Display the next page on the color map. This command is present only if the user has selected the Map Up utility (options menu, F6). This command will display the next page of the color map 24 (FIG. 2). Upon reaching entry 255, (i.e. the last page), the page display will wrap around to the first color map page. |
| Prev Screen | Prev Page | Display the previous page of the color map. This command is present only if |

TABLE III-continued

| KEY | NAME | DESCRIPTION |
|---|---|---|
| | | the user has selected the Map Up utility. (options menu, F6). This command will display the previous page of the color map 24 (FIG. 2). Upon reaching entry 0, (i.e. the first page), the page display will wrap around to the last color map page. |

In the color map mode, the user may define or change colors through direct manipulation of the color data for the color indices in the color map 24 (FIG. 2). Within this mode, the user may specify and or modify the color associated with each color map index. Invocation of this mode results in a page 50 (FIG. 4) of sample patches from the system color map being displayed automatically along the right side of the Color Editor Template. Since the entire color map cannot fit on the display at any one time, the map is divided into pages, each having an equal number of indices. The page 50 shown in FIG. 4 includes sample patches for color map indices 0-15. Different pages include sample patches for different groupings of the color map indices.

FIG. 4 shows the Color Editor Template employed in the Color Map Mode. When the user invokes the color map mode, the banner 84 at the bottom of the Color Editor Template contains additional commands for use in editing the Color Map (See FIG. 4). The Prompt Line consists of the following message: "Color Map Mode". Additional prompts related to user selections and/or errors may follow this message. The commands for editing in Color Map Mode are the same as those for Picture Mode with only the following differences as listed in Table IV below.

TABLE IV

| KEY | NAME | DESCRIPTION |
|---|---|---|
| F7 | Index | Selects a new color map index to edit. It also enables the user to quickly move to another location within the color map without repeated paging. Upon selection, the user is prompted to enter an index of the color map with the following message: "Enter Color Map Index". The Current color patch 44 in the Editor Template will display the requested index number and color assigned to that index. The HVC parameters and the chromaticity coordinates in block 46 are updated. The arrow 36 pointing to the Hue Bar 62 will move to the newly selected Hue and the V/C Page 68 will update to display the page shape for the selected Hue. The V/C marker 38 will point to the position of the color within the V/C Page 68. The color map page 50 containing the selected color index is automatically displayed. |
| SH F7 | Index | This is the same as F7. This arrangement allows F7 to function as the index command and by virtue of being "unshifted", appear as a primary menu item. This is the most logical placement since picking an index is a primary function in the Color Map Mode. |
| Next Screen | Next Page | Displays the next page of the color map. Upon reaching entry 255, (i.e. the last page), the page display will wrap around to the first color map page. |
| Prev | Prev | Displays the previous page of the |

TABLE IV-continued

| KEY | NAME | DESCRIPTION |
|---|---|---|
| Screen | Page | color map. Upon reaching entry 0, (i.e. the first page), the page display will wrap around to the last color map page. |

The color editor program utilizes a special color appearance-type color space herein termed the HVC color space, which classifies color in accordance with hue, chroma and value attributes as the basis for color selection. The HVC color space is constructed to provide the greatest amount of perceptual uniformity possible with respect to changes in the attributes (hue, value and chroma) by which colors are characterized.

The HVC color space may be most easily defined with reference to the CIELUV color space described hereinbefore in the Background of the Invention section.

The vertical axis V of the HVC space is defined as corresponding to the CIELUV metric lightness function $L^*$ or $$V = L^* \qquad (10)$$

Accordingly, for any selected color producible by the CRT 20, upon determination of the corresponding tristimulus value Y, the V coordinate is determined through use of equations (3) and (4), substituting V for $L^*$.

The H coordinate of the HVC space generally corresponds to the CIELUV hue angle and is assigned a value from 0 to 359 corresponding to 1° counterclockwise angular increments in the CIELUV $u^*v^*$ plane. The vertex of the hue angle is aligned with the V axis. The H coordinate is the value of the hue angle and is calculated as:

$$H = (\arctan(v^*/u^*) + K) + H_0 \qquad (11)$$

where
  $K = 0$ for $u^*$ greater than 0 and $v^*$ greater than 0;
  $K = 90$ for $u^*$ less than 0 and $v^*$ greater than 0;
  $K = 180$ for $u^*$ less than 0 and $v^*$ less than 0; and
  $K = 270$ for $u^*$ greater than 0 and $v^*$ less than 0.

The constant $H_0$ is selected to establish the 0 value or origin of H at the color most commonly associated with the term "red". In this regard, establishing $H = 0$ at approximately $-13°$, plus or minus 2°, positive $u^*$ axis in the CIELUV color system corresponds to the hue angle of a red that conforms in name to many conventional color-order systems such as the well-known Munsell Book of Color.

In view of the above, it can be appreciated that for any selected color producible by the CRT 20, upon determination of the corresponding tristimulus values XYZ, and transformation of those values into the CIELUV $L^*$, $u^*$ and $v^*$ coordinates via equations (5) and (6), the H coordinate of the HVC space can be computed with equation (11).

An important aspect of the HVC space is that the chroma coordinate C correlates to the gamut of colors that can be produced by the CRT 20, and is scaled to correspond to the value or V coordinate of the space. In short, the CIELUV chroma calculation $C^*_{uv}$ is modified by multiplying that chroma by the value coordinate V for the selected color and by a chroma factor $C_f$, which is a function of the maximum obtainable chroma for a given CRT phosphor set.

Accordingly, the C coordinate is calculated as:

$$C = C^*_{uv}(V)(C_f) \quad (12)$$

It has been found that the C coordinate defined above provides a more perceptually uniform CRT-based color space than heretofore available and offers greatly enhanced predictability in color selection. In this regard the C coordinate is numerically scaled from 0 to 100, with 100 equated to the maximum chroma or C level which can be displayed by the CRT. The scaling is achieved by defining the chroma factor $C_f$ as:

$$C_f = 100/\text{maximum chroma } C^*_{uv} \text{ for CRT.} \quad (13)$$

Multiplying the CIELUV chroma $C^*_{uv}$ for a selected color by the chroma factor $C_f$ and by the V coordinate of the HVC space enhances the perceptual uniformity of the HVC space so that at any hue H, a change of n units in the C coordinate will produce a perceived color difference substantially equal to the perceived color difference that occurs if the change of n units is made in the V coordinate. Likewise, for any hue H, a change of n units in the V coordinate will produce a perceived color difference substantially equal to the perceived color difference that occurs if the change of n units is made in the C coordinate.

To determine the maximum chroma $C^*_{uv}$ producible by the CRT (and thereafter calculate the chroma factor $C_f$) the u* and v* coordinates of the red, green and blue phosphor vertices are computed. A phosphor vertex is the point in the color space corresponding to the full intensity of one phosphor with the intensities of the remaining phosphors being zero. Typically the red phosphor vertex has the greatest $C^*_{uv}$ level. The following calculation of the red phosphor vertex is provided to illustrate how all phosphor vertices are calculated.

The calculation of the red vertex involves creation of a single column, three-row, red-rgb matrix, denoted [r]. The red-rgb matrix elements correspond to the full intensity DAC value (normalized to 1) for the red phosphor, and 0 DAC values for the green and blue phosphors. The DAC values correspond to the intensity of the light generated by the corresponding phosphors. Multiplication of the red-rgb matrix by an RGB-to-XYZ matrix [A], the derivation of which is described more fully hereinafter with respect to HVC space-to-RGB space translations, yields a red-XYZ matrix [R], the elements of which are the tristimulus values $X_r$, $Y_r$, $Z_r$ resulting from the full intensity red phosphor. In arithmetic linear matrix equation form:

$$[R] = [A][r], \text{ or } \begin{bmatrix} X_r \\ Y_r \\ Z_r \end{bmatrix} = [A] \begin{bmatrix} 1 \\ 0 \\ 0 \end{bmatrix} \quad (14)$$

Employing similar notation for the green and blue phosphors yields the equations:

$$[G] = [A][g], \text{ or } \begin{bmatrix} X_g \\ Y_g \\ Z_g \end{bmatrix} = [A] \begin{bmatrix} 0 \\ 1 \\ 0 \end{bmatrix} \quad (15)$$

and $$[B] = [A][b], \text{ or } \begin{bmatrix} X_b \\ Y_b \\ Z_b \end{bmatrix} = [A] \begin{bmatrix} 0 \\ 0 \\ 1 \end{bmatrix} \quad (16)$$

The CIE uniform chromaticity coordinates u', v' are next calculated for each vertex using equations (1) and (2). The $u'_n$ and $v'_n$ pair for the reference white is then calculated based on the previously-determined XYZ values of the reference white. Finally, the lightness function L* is calculated for each vertex. By way of example, the lightness L* of the red vertex is determined by multiplying the RGB-to-XYZ matrix [A] by the $Y_r$ row of the red-XYZ matrix to yield the $Y_{vr}$ tristimulus value corresponding to the red vertex or:

$$Y_{vr} = [A]Y_r$$

Incorporating $Y_{vr}$ into equations (3) and (4) yields the value of the metric lightness function $L^*_{vr}$ of the red vertex. Similar calculations yield $L^*_{gr}$ and $L^*_{br}$ values for the green and blue phosphor vertices, respectively.

Given the above values of u', v', $u'_n$, $v'_n$ and L* for each phosphor vertex, the u* and v* coordinates for each vertex are then calculated using equations (5) and (6).

For each phosphor vertex, the CIELUV chroma is then calculated according to equation (8). The maximum CIELUV chroma $C^*_{uv}$ of all vertices is then selected and used in equation (12) to determine the chroma factor $C_f$.

Referring now to FIG. 7, the HVC color space 90 is illustrated in terms of a large number of hue slices or V/C pages 68 within the color space 90 for a particular display device. One of the V/C pages 68 is presented by the interface on the graph 42 for each Hue selected on the graph 40.

Figure 8:
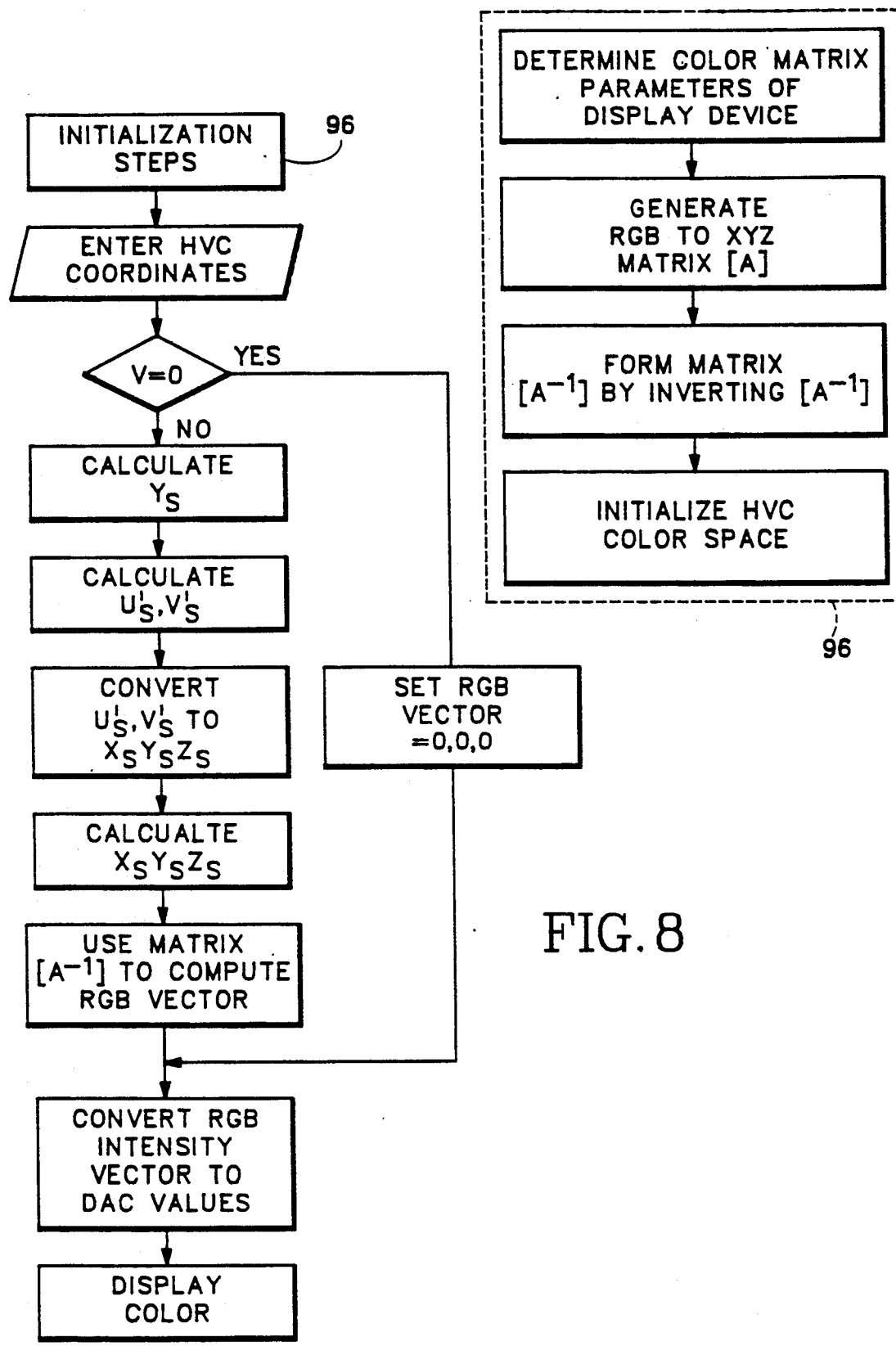
FIG. 8 is a flow chart showing the steps in the HVC to RGB transformation process as used in the present invention.

Referring to FIG. 8, the method for transforming the H, V and C parameters of a selected color in the HVC space 90 to the corresponding rgb intensity vector employed for displaying the selected color on a CRT display device 20 is now discussed.

The initialization steps shown as block 96 in FIG. 8 are first performed in the present transformation. The initialization steps need only be undertaken once for each display device although greater precision is possible if the colorimetric parameters of the device are periodically recalibrated.

As a preliminary step in carrying out the transformation process, the colorimetric parameters of the display device are determined. To this end, data corresponding to the CRT phosphor characteristics are compiled. These data are a tabulation of the luminous intensity levels of the red, green and blue phosphors generated in response to different values from the corresponding DACs 32 (FIG. 1). In RGB video space, DAC values are often defined in one unit increments ranging from 0–255, each DAC value being a numerical representation of the particular electron gun control level for excitation of a phosphor to a specific level of intensity. Thus, for example, the DAC-value/intensity table for the red phosphor describes the intensity level profile for each red electron gun control level. The DAC-value/intensity data may be that specified by the CRT manufacturer; however, for applications requiring precise color control it is preferred that the DAC-value/intensity data be measured and periodically updated via suitable spectroradiometric means. It is necessary to measure the DAC-value/intensity data because uniform changes in the electron gun control levels do not generate uniform changes in the luminous intensity level of the phosphors. The DAC-value/intensity tables are normalized to 1 and stored in the RAM memory 18 of the system 10.

In addition to the DAC-value/intensity data, the CIE XYZ tristimulus values for each primary phosphor are obtained for a reference white color that is produced by the CRT. Preferably, this tristimulus data is normalized so that the Y tristimulus value of the reference white will equal 1. As noted, the Y tristimulus value indicates the lightness of the color. Establishing the Y value at 1 will yield a corresponding scaling of the CIELUV metric lightness function L* at a maximum value of 100, which corresponds to the reference white of the display device.

Once normalized, the tristimulus data is arranged in a RGB-to-XYZ matrix, denoted [A] in accordance with well known techniques. The RGB-to-XYZ matrix elements represent the relative intensity contributions of the red, green and blue phosphors (columns) to the X, Y and Z values (rows) of the reference white. The RGB-to-XYZ matrix is next inverted to form an XYZ-to-RGB matrix, denoted [A$^{-1}$], the significance of which is described more fully below. Finally the HVC color space is initialized. That is, the constants and functions for defining the H, V and C coordinates of the HVC space are established for the particular CRT as previously described.

The H, V and C coordinates of the selected color are entered into the processor 14 of the system 10 by means of the color selection interface of the present invention. The V coordinate is immediately checked to determine if the black point has been selected (i.e., lightness or "value" V=0). If the black point has been selected, an appropriate rgb intensity vector is generated (i.e., all elements=0) and supplied to the CRT display device to display the black color as described more fully below.

If the black point is not selected, the tristimulus value $Y_s$ is calculated for the selected point. In this regard, it is noted that upon review of equations (3) and (4), it is clear that equation (3) is solved for $Y_s$ if the selected V coordinate is less than 8 (recalling that V=L*) otherwise equation (4) is employed.

The uniform chromaticity coordinates $u'_s v'_s$ are next calculated for the selected color. To this end, the distance from the known reference white point $u'_n$ and $v'_n$ is determined. This distance, D, is the CIELUV C*$_{uv}$ level. Accordingly the distance $D=C/((C_f)(V))$.

The u' axis component and v' axis component of the distance, D, is then calculated using the hue angle, which, as seen in equation (11), is the sum of the selected coordinate H and H$_0$. Accordingly, the $u'_s v'_s$ coordinates of the selected point are calculated as follows:

$$u'_s = u'_n + D(cos(H+H_0)) \quad (17)$$

$$v'_s = v'_n + D(sin(H+H_0)) \quad (18)$$

The $u'_s$, $v'_s$ coordinates of the selected point are then employed to determine the tristimulus values of the selected point. Specifically, the values x and y are calculated using equations (1) and (2) and the calculated values of $u'_s$ and $v'_s$. Further, the z chromaticity coordinate is determined as $$z = 1.0 - x - y. \quad (19)$$

With the selected $Y_s$ as calculated above, $$X_s = x(Y_s/Y) \text{ and} \quad (20)$$

$$Z_s = z(Y_s/Y) \text{ and} \quad (21)$$

As indicated in FIG. 3, the selected $X_s Y_s Z_s$ tristimulus values are next multiplied by the XYZ-to-RGB matrix [A$^{-1}$] to obtain the corresponding rgb intensity vector.

The rgb intensity vector is converted to DAC values by reference to the stored DAC-value/intensity tables. The DAC values corresponding to the selected color are applied to conventional digital-to-analog converters, which are adjusted to provide gamma corrections, and fed to the electron guns for displaying the selected color on the CRT display.

It will be obvious to those having skill in the art that many changes may be made to the details of the above-described preferred embodiment without departing from the underlying principles thereof. The scope of the present invention should be determined, therefore, only by the following claims.

We claim:

1. A user interface for controlling color selection in a computer system having a color display monitor, comprising:
    means for displaying on the monitor a graph depicting a range of hues in one dimension;
    means for selecting any hue displayed on the hue graph in response to input from the user and generating data representing this hue;
    means for displaying on the monitor a graph depicting chroma and lightness combinations in two-dimensions in a selected hue;
    means for selecting any chroma and lightness combination displayed on the chroma and lightness graph in response to input from the user and generating data representing this chroma and lightness; and
    register means for storing data representing one or more selected hue, chroma and lightness combinations.

2. The interface of claim 1, further comprising:
    frame buffer means including a plurality of registers associated with plural sections of a graphic image rendered on the display monitor for designating a color for each section of the graphic image displayed on the monitor; and
    wherein said register means includes a plurality of registers for separately storing data representing different hue, chroma and lightness combinations which are addressable in accordance with entries in said frame buffer means.

3. The interface of claim 2, further comprising:
means for automatically selecting a set of data representing hue, chroma and lightness combinations which uniformly vary in color between two endpoint combinations of hue, chroma and lightness stored in said register means in order to provide continuous shading between sections of the graphic image.

4. The interface of claim 1, further comprising:
means for displaying on the monitor a sample of color corresponding to a combination of hue, chroma and lightness represented by data stored in said register means.

5. The interface of claim 1 wherein:
said hue, chroma and lightness color attributes are defined as Hue, Chroma and Value dimensions, respectively, in a Hue-Value-Chroma color space having substantial perceptual uniformity.

6. A user interface for controlling color selection in a computer system for rendering a graphic image and having a color display monitor operating in accordance with a Red-Green-Blue color space, comprising:
means for displaying on the monitor a one-dimensional graph of a range of hue selections representing hues based upon a Hue-Value-Chroma color space having substantial perceptual uniformity;
means for selecting any hue displayed on the hue graph and generating data representing this hue in response to input from the user;
means for displaying on the monitor a graph of chroma and value combinations in two dimensions representing chromas and values based upon the Hue-Value-Chroma color space in a selected hue;
means for selecting any chroma and value combination displayed on the chroma and value graph and generating data representing this chroma and value in response to input from the user; and
means for translating data representing a selected hue, chroma and value combination based upon the Hue-Value-Chroma color space into Red-Green-Blue data corresponding to the same color in the Red-Green-Blue color space of the monitor.

7. The interface of claim 6, further including:
means for displaying on the monitor a sample of color corresponding to a combination of hue, chroma and value represented by the Hue-Value-Chroma color space data by using the Red-Green-Blue data to generate the color of the sample.

8. The interface of claim 6, further including:
frame buffer means including a plurality of registers associated with plural sections of a graphic image rendered on the display monitor for designating a color for each section of the graphic image; and
color map means including a plurality of registers for storing the Red-Green-Blue data corresponding to different hue, chroma and value combinations which are addressable in accordance with entries in said frame buffer means.

9. The interface of claim 8, further comprising:
means for automatically selecting a set of data corresponding to hue, chroma and value combinations which uniformly vary in color between two endpoint combinations of hue, chroma and value stored in two of said registers in order to provide continuous shading between sections of a graphic image.

10. In a computer system for rendering a color graphic image and having a color display monitor, a method of selecting a color in a color graphic image rendered by the computer system, comprising the steps of:
displaying on the monitor a graph depicting a range of hues in one dimension;
displaying on the monitor a graph depicting a range of chroma and lightness combinations in two-dimensions; and
generating color data representing a selected hue and a selected chroma and lightness combination in response to a selection input from a computer operator,
wherein said hue, chroma and lightness are defined as Hue, Chroma and Value dimensions, respectively, in a Hue-Value-Chroma color space having substantial perceptual uniformity.

11. An apparatus for modifying the color characteristics of a color image formed from a plurality of pixels on a color display monitor, comprising:
memory means for storing data relating to pixel color, including pixel index values and values defining specific colors in terms of hue (H), chroma (C) and lightness (L) parameters, each index value correlating a set of H, C and L values to at least one pixel;
means for selecting a specific pixel for color modification;
means for displaying on the monitor a graphical representation of hue, chroma and lightness combinations available based upon a color appearance-type color space characterized by perceptually uniform spacing between color selections;
means for selecting any combination of hue, chroma and lightness graphically represented on the monitor in response to input from a user and generating data representing this combination;
means for writing data representing a selected combination of H,C and L to the location within the memory means correlating with the selected pixel.

12. The apparatus of claim 11, wherein said means for displaying a graphical representation includes:
means for displaying on the color display monitor a first graph depicting a range of hues in one-dimension and a second graph depicting chroma and lightness combinations in two-dimensions.

13. The apparatus of claim 11, wherein:
said color appearance type color space comprises an HVC color space.

* * * * *